(12) United States Patent
Giacomini et al.

(10) Patent No.: US 8,804,107 B2
(45) Date of Patent: Aug. 12, 2014

(54) METHOD AND SYSTEM FOR WHEEL ALIGNMENT OF VEHICLES

(75) Inventors: Franco Giacomini, Örebro (SE); Marco Verveer, Örebro (SE); Torbjorn Backlund, Örebo (SE); Hans Karlsson, Kumla (SE)

(73) Assignee: Josam AB, Orebro (SE)

( * ) Notice: Subject to any disclaimer, the term of this patent is extended or adjusted under 35 U.S.C. 154(b) by 0 days.

(21) Appl. No.: 13/581,163

(22) PCT Filed: Feb. 25, 2011

(86) PCT No.: PCT/SE2011/050219
§ 371 (c)(1),
(2), (4) Date: Aug. 24, 2012

(87) PCT Pub. No.: WO2011/105960
PCT Pub. Date: Sep. 1, 2011

(65) Prior Publication Data
US 2012/0320370 A1    Dec. 20, 2012

(30) Foreign Application Priority Data
Feb. 26, 2010   (SE) ..................................... 1050182

(51) Int. Cl.
*G01B 11/26*   (2006.01)
(52) U.S. Cl.
USPC .................... 356/139.09; 356/4.01; 356/3.01; 356/5.01; 356/4.07; 356/5.09; 356/9; 356/625; 356/400; 356/401; 356/390

(58) Field of Classification Search
USPC ................................. 356/139.9, 390, 400, 401
See application file for complete search history.

(56) References Cited

U.S. PATENT DOCUMENTS

| | | | |
|---|---|---|---|
| 6,400,451 B1 * | 6/2002 | Fukuda et al. | 356/139.09 |
| 7,278,215 B2 * | 10/2007 | Hara | 33/203.15 |
| 7,974,806 B1 * | 7/2011 | Burns et al. | 702/105 |

FOREIGN PATENT DOCUMENTS

| | | |
|---|---|---|
| EP | 0664436 A2 | 1/1995 |
| EP | 0757779 B1 | 2/1997 |
| EP | 0943890 A2 | 9/1999 |
| EP | 0946857 A1 | 7/2005 |
| SE | 512165 C2 | 2/2000 |

* cited by examiner

*Primary Examiner* — Isam Alsomiri
*Assistant Examiner* — Samantha K Abraham
(74) *Attorney, Agent, or Firm* — Myers Bigel Sibley & Sajovec, PA

(57) ABSTRACT

Method for determining wheel alignment of a vehicle, which vehicle comprises at least one wheel axle (12, 13, 14) having an axle end with at least one wheel member (2*a-b*, 3*a-b*, 4*a-b*) at a respective longitudinal side of the vehicle. The method comprises steps for determining the out of square of the wheel axle in relation to the longitudinal geometric centerline of the vehicle. A system for carrying out the method is also described.

13 Claims, 3 Drawing Sheets

METHOD AND SYSTEM FOR WHEEL ALIGNMENT OF VEHICLES

RELATED APPLICATIONS

This application is a 35 U.S.C. §371 national phase application of PCT Application PCT/SE2011/050219, filed Feb. 25, 2011, which claims priority to SE 1050182.3, filed Feb. 26, 2010. The entire content of each of these applications is incorporated herein by reference.

FIELD OF THE INVENTION

The invention relates generally to wheel alignment of vehicles. Especially the invention relates to a method and a system for determining the out of square of vehicle wheel axles.

BACKGROUND

Wheel alignment of vehicles encompasses measurement, calculation and determination of several different angles related to the wheels and wheel axles of the vehicles. Examples of such angles that are of importance for maintaining or enhancing security, functionality and economics of vehicles are; toe, steering wheel centering, camber, caster, king-pin inclination, toe-out on turn and max turn.

In addition and especially for heavier vehicles such as for lorries, trucks, busses, towcars, trailers and semitrailers, the out of square of wheel axles, especially of rear wheel axles, is of great importance. Out of square, sometimes referred to as thrust angle, is defined as an angle formed between the longitudinal centreline of the vehicle and the so called trust line of the wheel axle in question. The trust line in turn is defined as the normal to the longitudinal axis of the wheel axle. In practice however the out of square for a wheel axle is normally defined and calculated as the difference between the toe angle for the right and left wheel divided by two. Irrespective of how the out of square is defined and calculated it is of great importance that the longitudinal geometrical centreline of the vehicle can be accurately determined for allowing accurate determining of the out of square.

It is further of great importance to be able to determine and, by adjustments made to the vehicle, minimize the out of square, since any out of square differing from zero substantially increases tyre wear and fuel consumption of the vehicle. Out of square other that zero also increases the effective widths occupied by the vehicle when travelling on a road. This in turn increases the air resistance of the vehicle which results in further increased fuel consumption and deteriorates road safety.

PRIOR ART

Several different methods and systems for measuring and determining various wheel alignment parameters are known in the prior art.

EP 0 946 857 B1 discloses a method and a system wherein wheel angles, the direction of travel and the longitudinal geometric centreline of the vehicle is measured as the vehicle passes with the wheels rolling on the surface past measuring units.

EP 0 664 436 A2 describes a device and a method for measuring wheel angles of vehicles. The system comprises pairs of scales which are arranged in front of and behind the vehicle and connected to a computer. Lasers are fastened to the wheels and emit light beams to the scales. The positions of the light beams on the scales are registered by the scales and the computer calculates the toe-in and camber of the wheels.

SE 512 165 C2 describes another optical system including cameras instead of lasers, for determining wheel angles. A camera is pivotally mounted to each wheel which is to be measured. The cameras register reference marks that are arranged in front of and behind the wheels. The reference marks may be positioned around the vehicle whereby the toe-in may be determined. Alternatively, the reference marks may be attached to the vehicle, symmetrically on each side of the vehicle, whereby also the trust angle of a wheel axle may be determined.

EP 0 757 779 B1 discloses a system for measuring wheel angles and chassis units positions of a vehicle. The system comprises a measuring unit including a laser and means for detecting the angle of a reflected laser beam. The measuring unit is attached to a wheel which is to be measured. The system further comprises measurement scales provided with sensitised points. The scales are fixed to the front and rear end of the vehicle frame by means of lateral gauge rods and attachment devices that ensure that the distance between the scales and the vehicle frame, and thereby, between the scales and the longitudinal axis of the vehicle is the same for all scales. The measuring unit emits laser beams which are reflected by the scales back to the measuring unit, which registers the angle of the reflected beam. The system disclosed in EP 0 757 779 B1 allows for determination of different wheel and axle angles in relation to the longitudinal axis of the vehicle.

EP 0 943 890 A2 discloses a camera based method and device for measuring characteristic attitude angles of an automobile. The device comprises a vehicle lift arranged at a measurement site, four cameras which are attached to a respective wheel of the automobile and two reference markers which are fixed to the vehicle lift, in front of the automobile. The device may also comprise ultrasonic sensors fixed to the vehicle lift, sideways of the automobile, for determining the deviation between the longitudinal axis of the automobile and the longitudinal axis of the measurement site. The document further states that the longitudinal axis of the automobile may be determined by using the cameras attached to the wheels of the automobile.

SUMMARY OF THE INVENTION

It is an object of the invention to provide an enhanced method and system for determining wheel alignment of a vehicle. Another object is to provide such a method and system for allowing facilitated determination of the out of square of wheel axles of a vehicle. A further object is to provide such a method and system which enable the out of square and other wheel alignment parameters to be readily determined with a high degree of accuracy. Still another object is to provide such a method and system by means of which the out of square of a wheel axle may be determined without the need of fastening scales or other reference devices to the body or chassis of the vehicle.

These and other objects are achieved by a method of the type defined in the preamble of claim 1, which method comprises the special technical features as defined in the characterizing portion of claim 1. The method is intended for determining wheel alignment of a vehicle, which vehicle comprises a first wheel axle having an axle end with at least one wheel member at a respective longitudinal side of the vehicle. The method comprises the steps of; arranging, for each longitudinal side of the vehicle, a first and a second optical reference element, each having at least two measuring marks defining a reference plane, at fixed positions at a measuring site and such that the reference planes are generally in parallel with each other; positioning the vehicle at the measuring site, such that there, for each longitudinal side of the vehicle, is free sight between the wheel members and the respective first and second optical reference elements; mounting an optical measuring instrument to a wheel member at each axle end of the first wheel axle; and mounting an optical measuring instrument to a wheel member at each axle end of a second wheel axle or to each end of a measuring rod mounted to the vehicle. According to the invention the method further comprises the steps of; determining a first relative position of each wheel member and each measuring rod end to which an optical measuring instrument has been mounted, by means of the optical measuring instrument and the first and second reference elements arranged at each side of the vehicle; determining a first toe angle the wheel member at each axle end of the first wheel axle, by means of the optical measuring instrument and the first and second reference elements arranged at each side of the vehicle; determining a first geometrical centreline of the vehicle based on the first relative positions; rotating each wheel member approximately 180°; determining a second relative position of each wheel member and each measuring rod end to which an optical instrument has been mounted, by means of the optical measuring instrument and the reference elements arranged at each side of the vehicle; determining a second toe angle of the wheel member at each axle end of the first wheel axle, by means of the optical measuring instrument and the first and second reference elements arranged at each side of the vehicle; determining a second geometrical centreline of the vehicle, based on the second relative positions; and calculating the out of square of the first wheel axle, based on the second geometrical centreline of the vehicle, the second toe angles, the differences between the first and second geometrical centrelines and the differences between the respective first and second toe angles.

At the inventive method it is sufficient to rotate the wheel members 180° or one half revolution. This may be done either by lifting the vehicle and rotating each wheel member or by pushing or otherwise moving the vehicle a short distance which corresponds to half of the circumference of the wheel members. By this means the longitudinal extension of the measuring site may be kept comparatively short, which is advantageous for space and cost saving reasons. Additionally, the results of the method may immediately be used for carrying out the necessary adjustments of the vehicle on site and thereafter to apply the method once again in order to check that the adjustments have resulted in correct wheel alignment. At each measuring operation at such a repeated measuring, the wheel members may be rotated in either direction. Thereby it is possible to alternately move the vehicle back and forth at the comparatively short measuring site. Such alternate applying of the method and carrying out adjustments may thus be repeated again and again at a limited space, until correct wheel alignment has been achieved without the need of moving the vehicle from the site.

According to the invention, determination of relative positions of wheel members arranged at the respective end of a first wheel axle and a second wheel axle or the positions of respective ends of a measuring rod are used for determining the longitudinal geometric centreline of the vehicle. It is understood that the calculation of the out of square may be based on the actual longitudinal centreline of the vehicle or any virtual vector or line which is parallel with the actual longitudinal centreline of the vehicle. In this document the term longitudinal centreline of the vehicle encompasses also such virtual lines being parallel with the actual centreline of the vehicle. The wheel members used may be the wheel rim of a respective wheel mounted to a wheel hub arranged at each axle end of the wheel axle. The wheel members used may also be the respective wheel hub. These relative positions of the wheel members may be determined without the need of fixing any references marks or the like to the vehicle. This amounts to substantial advantages in relation to previously known methods, where accurate and precise positioning and fixing of reference devices to the vehicle is required for allowing determination of the longitudinal centreline of the vehicle and any angle in relation to the centreline. Such accurate fixing of reference devices to the vehicle is cumbersome, time consuming and requires the use of special tools and mounting devices. At the method according to the invention reference elements are instead arranged at the site in the surrounding of the vehicle, whereby any labour and material for accurately fixing reference devices to the vehicle may be dispensed with. Additionally, the method comprises utilizing two reference elements at each longitudinal side of the vehicle. Using two different reference elements at each side enhances considerably the accuracy by which the optical measuring instrument may determine the relative positions and the toe angles of the wheel members and, where applicable, the measuring rod ends.

At the method according to the invention, the longitudinal centreline of the vehicle is determined and used for calculating the out of square of at least one wheel axle. The definition of the centreline achieved and the out of square may further be used for calculating other wheel alignment parameters such as axle parallelism, steering wheel centring and twin steer alignment. The method comprises measuring the relative position of each wheel member and, when applicable, each measuring rod end before and after the wheel members have been rotated 180°. Also the toe angle for each wheel member is measured before and after 180° rotation of each wheel member. The toe angle of a wheel member is herein used for denominating the deviation in the direction of travel in relation to the longitudinal centreline of the vehicle for the specific wheel member. According to the invention the first and second determination of the relative positions of the wheel members and, where applicable, the measuring rod ends, is used for determining the change of the vehicle's longitudinal centreline and thereby the change of the vehicle's direction of travel during rotation of the wheel members. Such a change of the vehicle's longitudinal direction may be caused by a number of different inaccuracies of different vehicle components. Examples of such inaccuracies are differences in the camber, the height of tires, the tyre pressure and the wear of tires of wheel members on each longitudinal side of the vehicle. By determining first and second relative positions and calculating first and second longitudinal directions of the vehicle, all such inaccuracies may be compensated for when calculating the out of square of a specific wheel axle.

Additionally, the determination of first and second toe angle of each wheel member is used for compensating any inaccuracy by which the optical measuring instrument has been mounted to the respective wheel member. Typically, such inaccuracies are caused by that the optical measuring instrument has not been attached to the wheel member in such a way that the reference line of the optical instrument is perfectly parallel with or perpendicular to the wheel axle of the respective wheel member. Such an inaccuracy may also be caused by skewness or other deformities of the wheel member. The determination of the first and second toe angle for each wheel member is, according to the invention, used for compensating for any such inaccuracy when calculating the out of square of a specific wheel axle.

Hence, by carrying out the method according to the invention, a very accurate determination, which is independent of any inaccuracy of various different vehicle components, is achieved in an efficient and time saving manner. The method further requires only a limited space for being readily carried through and it may be realized with a comparatively simple measuring system comprising only a limited number of measuring system components.

When the method is applied to vehicles having at least one front wheel axle and at least one rear axle the method may comprise determining the first and second relative position of a wheel member at each axle end of a first and a second wheel axle. This is done by means of the optical measuring instrument and the first and second reference elements arranged at each side of the vehicle. The first and second geometrical centreline of the vehicle is at such embodiments determined based on the first and second relative positions of the wheel members at each axle end of a first and a second wheel axle.

When the method is applied to e.g. vehicles such as semitrailers, without any front wheel axle, the method may comprise attaching a rod to the vehicle such that a rod end is arranged at a respective longitudinal side of the vehicle. Typically the rod may be attached to a king pin of a semitrailer. The method then further comprises mounting an optical measuring instrument to each rod end, determining the first and second relative position of each rod end, by means of the optical measuring instrument and the first and second reference elements arranged at each side of the vehicle, and determining the first and second geometrical centreline of the vehicle based on the first and second relative positions of the rod ends and the wheel members at each axle end of the first wheel axle.

Both reference elements at each longitudinal side of the vehicle may be positioned either in front of or behind the vehicle. It is however advantageous if, at each side of the vehicle, a first reference element is arranged in front of the vehicle and a second reference element behind the vehicle. Hereby it is ascertained that the distance between the optical measuring instrument and at least one of the reference elements is comparatively great, for each wheel member and when applicable each measuring rod end. Such a great distance contributes in a significant manner to enhance the accuracy by which the optical measuring instrument may determine the relative position and toe angle.

A single pair of first and second reference elements may be used. The reference elements is then first arranged at one longitudinal side of the vehicle for measuring the wheels on that side, and thereafter moved to and arranged at the other longitudinal side for measurement of the wheels on this side. Preferably however the method comprises arranging a first pair of first and second reference elements for a first longitudinal side of the vehicle and a second pair of first and second reference elements for a second longitudinal side of the vehicle. Hereby wheels on both side of the vehicle may be measured without the need of rearranging any reference elements.

The method may comprise utilizing a single optical measuring instrument and sequentially mounting said single optical measuring instrument to a respective wheel member at each axle end of the wheel axles and, when applicable to each end of the measuring rod, for sequential determination of the relative positions of the respective wheel members and rod ends. Since only one optical measuring instrument is needed, this allows for that the method may be carried out at a comparatively low investment cost.

Alternatively the method may comprise utilizing a first and a second optical measuring instrument. Hereby, the method may be carried out in shorter time than if a single optical measuring instrument is used. One optical measuring instrument may e.g. be used for each side of the vehicle and the operator carrying out the method may mount the optical measuring instruments to the different wheel members and measuring rod ends, in the order which is most convenient and/or involves the shortest total walking distance for the operator.

The invention also encompasses that a separate optical measuring instrument is used for each wheel member and measuring rod end which is to be measured. Hereby the time needed for carrying out the method may be further reduced. However this embodiment requires a comparatively large investment cost.

The optical measuring instrument may be mounted to a wheel member by means of a wheel adapter arranged between the wheel member and the optical measuring instrument. Hereby correct alignment of the optical measuring instrument in regard of the rotational axis of the wheel member may be facilitated. The use of wheel adapters may also reduce the time needed for fixing the optical measuring instrument to the wheel member.

The step of determining the actual toe-angle for each wheel member may further comprise; first determining the first relative toe-angle for each wheel, thereafter simultaneously rotating all wheel members approximately 180° and thereafter determining the second relative toe-angle for each wheel. This allows for a quick and labour saving compensation for skewness and other deformities of all of the wheel members to be measured.

The method may advantageously be carried out using an optical measuring instrument which comprises a laser. Hereby accurate results may be readily achieved at a comparatively low cost. Laser based measuring instruments for wheel alignment further provides a large angular operating range i.e. a wide visual field. This contributes to further improve the possibility of free and flexible positioning of the references elements at the site where the method is to be applied.

Alternatively the method may be carried out using an optical measuring instrument which comprises a camera. The utilization of a camera based measuring instrument may at some applications of the method provide advantages since camera based instruments generally are lighter and sometimes more durable than laser based instruments.

The invention also relates to a system for carrying out the method. The system according to the invention is defined in the appended claim 13. The system according to the invention exhibits the same and corresponding objects and advantages as set out above in regard of the method according to the invention.

Further objects and advantages of the invention appear from the following detailed description of embodiments and from the appended claims.

BRIEF DESCRIPTION OF THE DRAWINGS

Exemplifying embodiments of the invention will hereafter be described with reference to the accompanying drawings, in which.

DETAILED DESCRIPTION OF EMBODIMENTS

Figure 1:
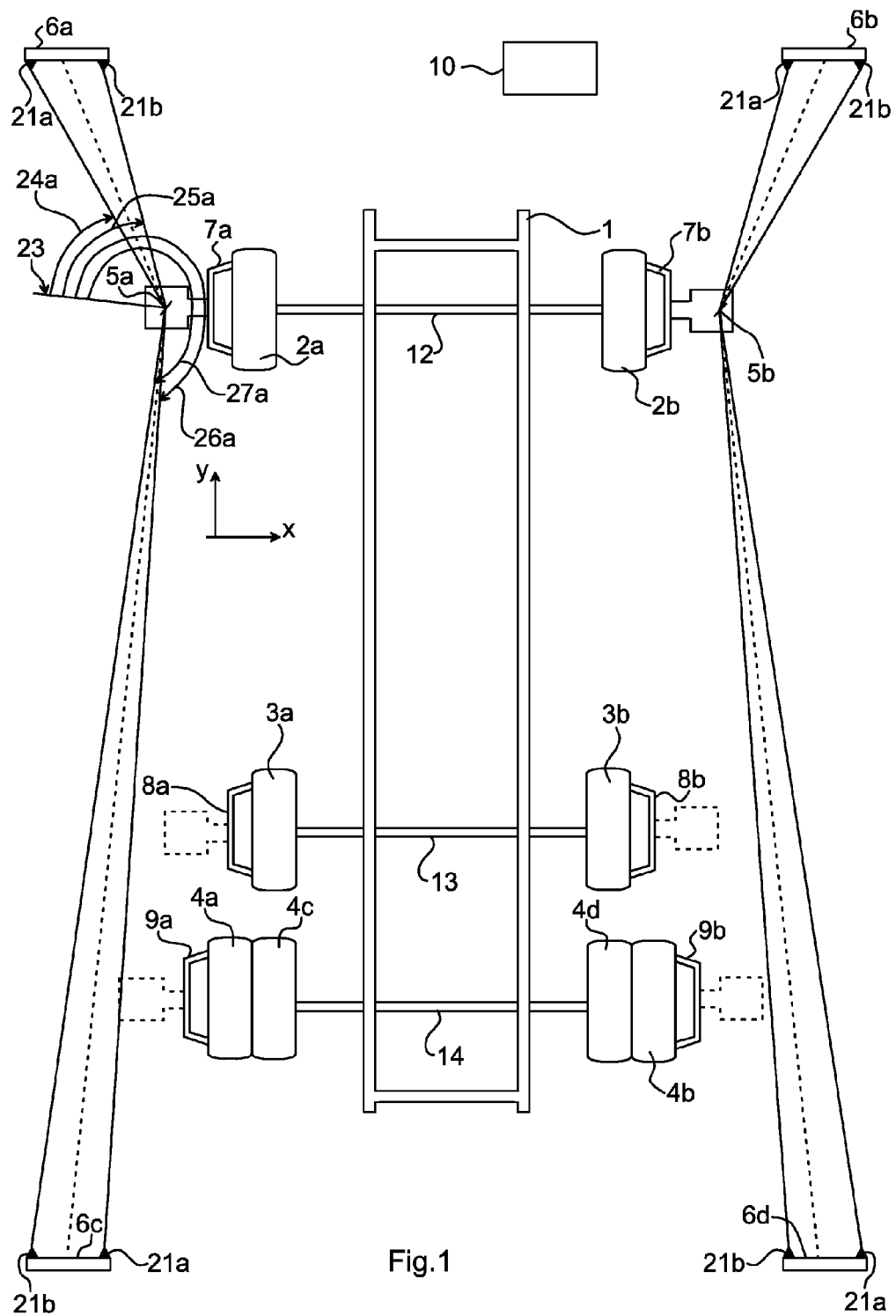
FIG. 1 is a schematic plan view of a system according to an embodiment of the invention and a schematically illustrated vehicle.

FIG. 1 illustrates a system for wheel alignment according to a first embodiment of the invention. A vehicle is illustrated by its frame 1, its first 12, second 13 and third 14 wheel axles. Wheel members represented by wheels 2a, 2b are arranged at a respective axle end of the first wheel axle 12. Wheels 3a, 3b are arranged at respective axle ends of the second wheel axle 13. Wheels 4a, 4b are correspondingly arranged at respective axle ends of the third wheel axle 14. The third wheel axle 14 carries in addition interior wheels 4c, 4d.

The system includes optical measuring instruments, which in this embodiment are constituted by laser instruments 5a-b, optical reference elements 6a-d and wheel adapters 7-9. In the example shown, the system comprises a first and a second laser instrument 5a-b, which are attached to a respective front wheel 2a-b of the vehicle, by means of a respective wheel adapter 7a-b. The laser instruments 5a-b are arranged to measure angles by emitting light that is reflected back to the respective laser instrument 5a-b, by optical references 6a-d which are arranged at the measuring site which for example may be arranged in a work shop.

In the example shown, the system comprises a first pair of reference elements 6a, 6c arranged at one longitudinal side of the vehicle and a second pair of reference elements 6b, 6d arranged at the opposite longitudinal side of the vehicle. First reference elements 6a, 6b of each pair are arranged in front and outside of a respective front wheel 2a, 2b at the first wheel axle 12. Second reference elements 6c, 6d are arranged behind and outside of respective wheels 3a, 3b, 4a, 4b arranged at the second 13 and third wheel axle. Each optical references element 6a-6d comprises two reference marks 21a, 21b which are arranged such that they define a horizontal reference line there between. The distance between the reference marks 21a, 21b, along the reference line is known and preferably equal for each reference element 6a-6d. The reference elements 6a-6d are further arranged such that all reference lines are in parallel with each other. In the example shown, the reference lines of the first reference elements 6a, 6b are arranged along a first common line and the reference lines of the second reference elements 6c, 6d are arranged along a second common line, the first and second common lines being parallel to each other. The reference elements 6a-6d may however be arranged freely at the site, as long as the distance between the reference marks 21a, 21b is known and the reference lines are in parallel with each other. The reference elements 6a-6d also needs to be arranged such that there is free sight between the reference marks 21a, 21b and the respective wheels that are to be measured. The reference elements 6a-6d may e.g. be fixed to poles in the floor or as signs on the walls in front of and behind the area where the vehicle is to be positioned.

The laser instruments and reference elements are preferably of the types described in the European patent EP 0 757 779 B1 discussed above.

The system further comprises a computing unit 10 which is arranged in communication with the laser instruments 5a, 5b. Preferably the laser instruments 5a, 5b are connected to the computing unit 10 by wire less communication means, such as by blue tooth, but also other means of communication such as by electrical wires is comprehended.

Figure 3:
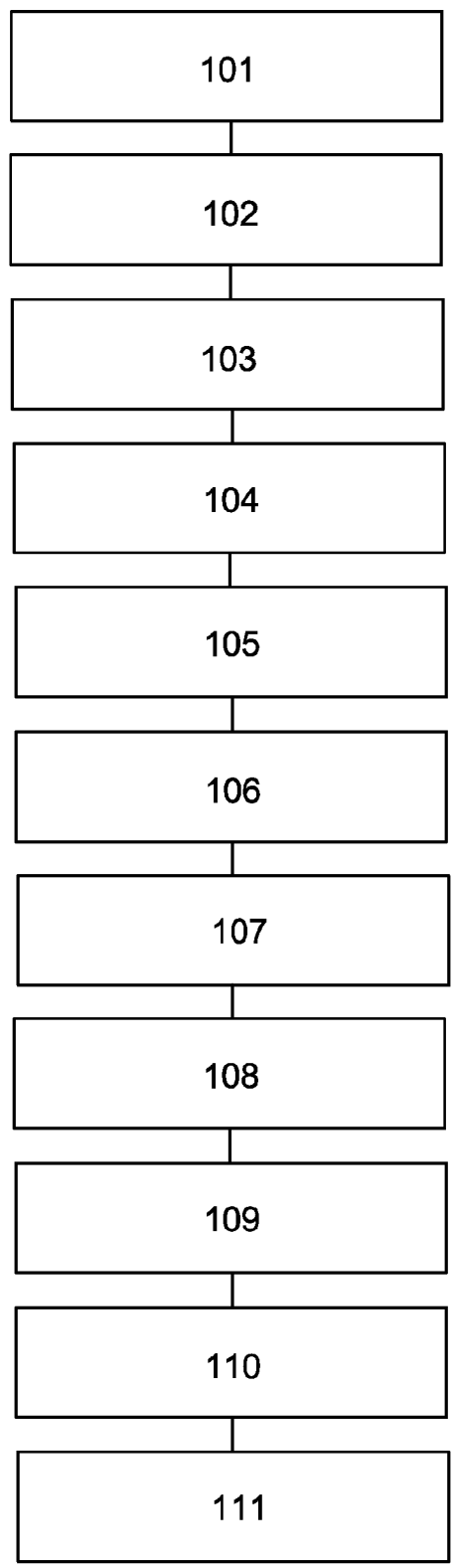
FIG. 3 is a schematic representation of a method according to one embodiment of the invention.

With reference to FIG. 3 a method according an embodiment of the invention will now be described. When carrying out the method the system described above may be used.

In one step 101 of the method, the reference elements 6a-6d are arranged at the site as described above. Such arrangement may be carried out once and in advance of all subsequent carrying through of the method, e.g. when setting up the system at a measuring site in a work shop. However it is also possible that the reference elements 6a-6d are arranged before or during each carrying through of the method, and that they are rearranged occasionally e.g. when vehicles of certain dimensions are to be measured. In the example shown in FIG. 1 two pairs of reference elements are used. It is however also possible that only one pair of reference elements is used. The reference elements are then first arranged at one longitudinal side of the vehicle and thereafter, when the wheels on this side have been measured, rearranged on the other side of the vehicle.

In another step 102, the vehicle is positioned at the measuring site. The vehicle should be positioned such that there is free sight between each wheel to be measured and both reference elements in each corresponding pair of reference elements. At the illustrated example the longitudinal axis of the vehicle is arranged generally perpendicular to the horizontal reference line between the reference marks 21a, 21b and such that the wheel axles 12, 13, 14 are arranged between the respective planes 6a, 6c of the first and second 6c, 6d reference elements.

A further step 103 involves mounting of a laser instrument 5a, 5b to a respective wheel at each axle end of the first 12, second 13 and possibly any additional 14 wheel axles. In the example shown two laser instruments 5a, 5b are used. When utilizing such a system comprising two laser instruments, the laser instruments are first mounted to respective wheels of a first wheel axle 12. When a measuring operation for these wheels has been carried out, the laser instruments are moved to respective wheels on the second wheel axle, which wheels thereafter are measured. Thereafter the laser instruments may be moved to and used for measuring of any additional number of axles. It is however also possible that one single laser instrument is used, whereby this laser instrument is sequentially mounted to and used for measuring different wheels in consecutive order. When the number of laser instruments used is lower than the number of wheels to be measured, the method provides the advantage that the operator is free choose any order in which the different wheels are to be measured. Typically the operator will choose that order of attaching the measuring instrument to the respective wheels and measuring these wheels, which involves the shortest total walking distance for the operator. It is also possible that a number of laser instruments corresponding to the number of wheels to be measured are used. Hereby the laser instruments may be attached to a respective wheel where after all wheels may be measured simultaneously.

The above mentioned steps 101, 102 and 103 may be carried out in any desirable and suitable order depending on the circumstances. After steps 101, 102 and 103 have be carried out the following further steps of the method are carried out.

In step 104 a first relative position of four wheels, having a laser instruments attached thereto is determined by the respective laser instrument and the respective pair of reference elements arranged on the corresponding side of the vehicle. At the exemplifying embodiment a first longitudinal geometric centreline of the vehicle is determined by first determining first relative positions of two wheels arranged at a respective axle end of two wheel axles. For achieving accurate determination of the first geometrical centre line a front 12 and a rear 13, 14 wheel axle is used. In other words, the first relative position of four wheels is first determined. In case a single laser instrument is used, this instrument is sequentially arranged at and used for determining the first relative position of the wheels in question. In case two laser instruments are used, these are first arranged at and used for determining the first relative position of the two wheels arranged at respective axle ends of the first wheel axle and thereafter moved to and used for determining the relative position of corresponding wheels of the second wheel axle. In case four or more laser instruments are used, the first relative position of all wheels may be determined simultaneously.

In cases where the vehicle to be measured does not comprise any front wheel axle, such as e.g. at semi trailers, a rectilinear measuring rod (not shown) is first attached to the king pin or a similar element of the vehicle. The rod is arranged horizontally and such that one rod end is positioned at each longitudinal side of the vehicle. The rod thus functions as a dummy wheel axle and the optical measuring instruments are attached to the respective rod ends for determining their first relative positions.

The first relative position of each wheel and, when applicable, each rod end is, at the exemplifying embodiment, determined by first calculating a first toe angle of that wheel. This is accomplished by that the respective laser instrument 5a-b registers the two reference marks 21a-b on each of the respective two reference elements 6a-d arranged at the corresponding side of the vehicle. In addition to the reference marks 21a, 21b, additional marks may also be provided on the reference elements 6a-d, such that the reference elements 6a-d readily can be distinguished from each other, for example to distinguish the optical references 6a-b in front of the vehicle from the optical references 6c-d to the rear of the vehicle, or to distinguish optical references 6a, 6c on the left side from the references 6b, 6d on the right side.

The angles 24a-27a from a reference axis 23 of the laser instrument 5a-5d, to the reference marks 21a-b are measured by means of the laser instrument for both the forward and backward reference elements. Since the distances between the reference marks 21a-b are known for all reference elements 6a-d, the measured angles 24a-27a may be used for determining the first toe angle for the respective wheel.

In practice this is done, for each wheel, by an iterative calculation process carried out by the computing unit 10. Initially, approximate xy-positions in the xy-plane (indicated in FIG. 1) of each reference mark 21a-b for both reference elements 6a, 6c relative to the laser instrument 5a and the approximate distances from the laser instrument 5a to each reference mark 21a-b are calculated utilizing the measured angles 24a-27a. At this initial approximate calculation, it is assumed that the horizontal reference lines defined by the reference marks 21a-b on each reference element 6a, 6c is parallel with the reference line 23 of the laser instrument. Thereafter, an approximate first toe angle of the wheel is calculated based on the relative xy-positions of each reference mark 21a-b and their respective distance to the laser instrument 5a. The calculated approximate first toe angle is then used for, once again calculating the xy-position of each reference mark 21a-b for both reference elements 6a, 6c and the distances from the laser instrument 5a to each reference mark 21a-b. At this operation no assumption about the orientation of the horizontal reference line defined by the reference marks 21a-b is made. The so achieved new values for the xy-positions and distances are again used for calculating a new value of the first toe angle. The latest mentioned two operations are then iteratively repeated, typically about five times. This iterative calculation results in an accurate value of the first toe angle of the wheel in question.

The resulting first toe angle, the xy-positions of the reference marks 21a-b and the distances between the references marks and the laser instrument achieved by this iterative calculation is then used for determining a first relative position in the xy-plane indicated in FIG. 1 of the laser instrument and thereby of the wheel by geometrical calculations carried out by the computing unit 10.

For clarity the reference axis 23 and the angles 24a-27a from this axis to the reference marks 21a-b are in FIG. 1 illustrated for only one instrument (5a), but the same angles are also measured for the other instrument (5b) or all instruments determining the relative positions of the wheels and possibly the rod ends to be measured.

Once the first relative position of the wheels arranged at respective ends of at least two wheel axles has been determined, the following step 105 of the method is carried out.

In step 105 a first longitudinal geometric centreline of the vehicle or a virtual line being parallel with the actual centreline is determined. This is done by calculating the distance between the wheels or laser instruments arranged at respective ends of each wheel axle and possibly each rod end. The first longitudinal geometric centreline is thereafter defined as the straight line which intersects both wheel axles at their respective centre points i.e. at a point positioned half way between the wheels at respective ends of the axles.

In step 106 of the method, a first toe angle for the wheels at each axle end of the second wheel axle may be determined. These toe angles are thereafter used in the step for calculating the out of square for the second wheel axle. However, in the exemplifying embodiment of the method described here, the first toe angles of the wheels arranged on the second wheel axle have already been determined and these already determined first toe angle values may be stored and used again in the following step 111. In case the first relative positions of the wheels have been determined without determining the corresponding first toe angles, the first toe angles may in step 106 be determined for the wheels of the second axles in a manner which corresponds to the manner which is described at step 104 above.

In step 107 each wheel which is to be measured is rotated approximately 180°. This may be done by lifting the vehicle and rotating each wheel without moving the vehicle. Such lifting of the vehicle and rotating of the wheels may be applied e.g. when the vehicle to be measured is a semi-trailer, without any front wheel axle. At vehicles comprising at least one front and at least one rear wheel axle, it may be advantageous to rotate all wheels simultaneously by moving the entire vehicle in either the forward or backward direction, while maintaining the wheels in contact with the ground. The vehicle is then moved only a distance which corresponds to half the circumferential length of the wheels.

In step 108, a second relative position of each wheel and, when applicable, each rod end is determined in the same manner as described above with reference to step 104.

In step 109, a second longitudinal centreline of the vehicle is calculated in the same manner as described above, with reference to step 105.

In step 110 a second toe value of each wheel member of the second wheel axle may be determined in the same manner as described above, with reference to step 106.

In step 111 of the method, the out of square of the second wheel axle is calculated. This may be done by using the second relative positions of the wheels arranged at the second wheel axle for determining the longitudinal direction of the second wheel axle and the geometrical normal to this direction. The out of square is thereafter calculated as the angle between this normal, which constitutes the trust line of the second wheel axle, and the second longitudinal geometric centreline of the vehicle. However, since the above described manner of determining the toe angle of the respective wheels already results in a value which is related to the longitudinal geometric centreline of the vehicle, the out of square of the second wheel axle may simply by calculated as the difference between the second toe angle for the wheel members at each axle en divided by two. The method further comprises to compensate the out of square for any inaccuracies resulting from e.g. differences in the camber, the height of tires, the tyre pressure and the wear of tires of wheel members on each longitudinal side of the vehicle. Other causes to such inaccuracies may be skewness or other deformations of the wheel members and inaccurate alignment of the laser instrument's reference line with the longitudinal axis of the respective wheel axle. Such inaccuracies are compensated for, when calculating a true out of square by adjusting a calculated nominal out of square with the difference between the first and second centreline and the differences of the respective first and second toe angle for each wheel member for which the toe angle has been determined. The compensation of the out of square may also be made directly during the calculation of a true out of square by incorporating said differences in the calculation of a single true value of the out of square, i.e. without first calculating a nominal value of the out of square.

By means of the system and method described above, the out of square of at least one wheel axle, which wheel axle may be any of two or more axles comprised in a vehicle, is readily and quickly determined without the need of fixing any reference devices to the vehicle. In addition a very accurate and precise value of the out of square is attained by a comparatively simple and time efficient method. The method may further be applied by means of a comparatively simple measuring system comprising a low number of measuring components. The method may also be carried through at a measuring site which requires only a limited space and especially only a comparatively small longitudinal extension.

At a further embodiment of the method the laser instruments are attached to the wheels by means of respective wheel adapters 7a-b, 8a-b, 9a-b. A separate wheel adapter is preferably mounted to each wheel which is to be measured. Irrespective of how many optical measuring instruments are used, this or these instruments may readily be attached to the respective wheel adapter. The wheel adapters 7a-b, 8a-b, 9a-b facilitate correct alignment of the optical measuring instruments and speeds up the carrying out of the method by facilitating mounting of the optical measuring instruments.

By determining a first and a second toe angle of each wheel, before and after rotation of the wheels, the method compensates for any skewness or other deformation of the wheels also at such an embodiment of the method.

Preferably the first relative toe values are first determined sequentially or simultaneously for all wheels and the second relative toe values are thereafter determined sequentially or simultaneously determined for all wheels after simultaneous rotation of all wheels, i.e. by driving or pushing the entire vehicle a distance which corresponds to a wheel rotation of about 180°.

In the above described system and method, an optical measuring instrument comprising a laser have been described. The invention however also encompasses that other optical measuring instruments may be used in a corresponding manner. For instance, an optical measuring instrument comprising a camera such as the instrument described in SE 512 165 C2 may be used. Such a system and method utilizing a camera achieves the same advantages as the laser based system and method described above.

Figure 2:
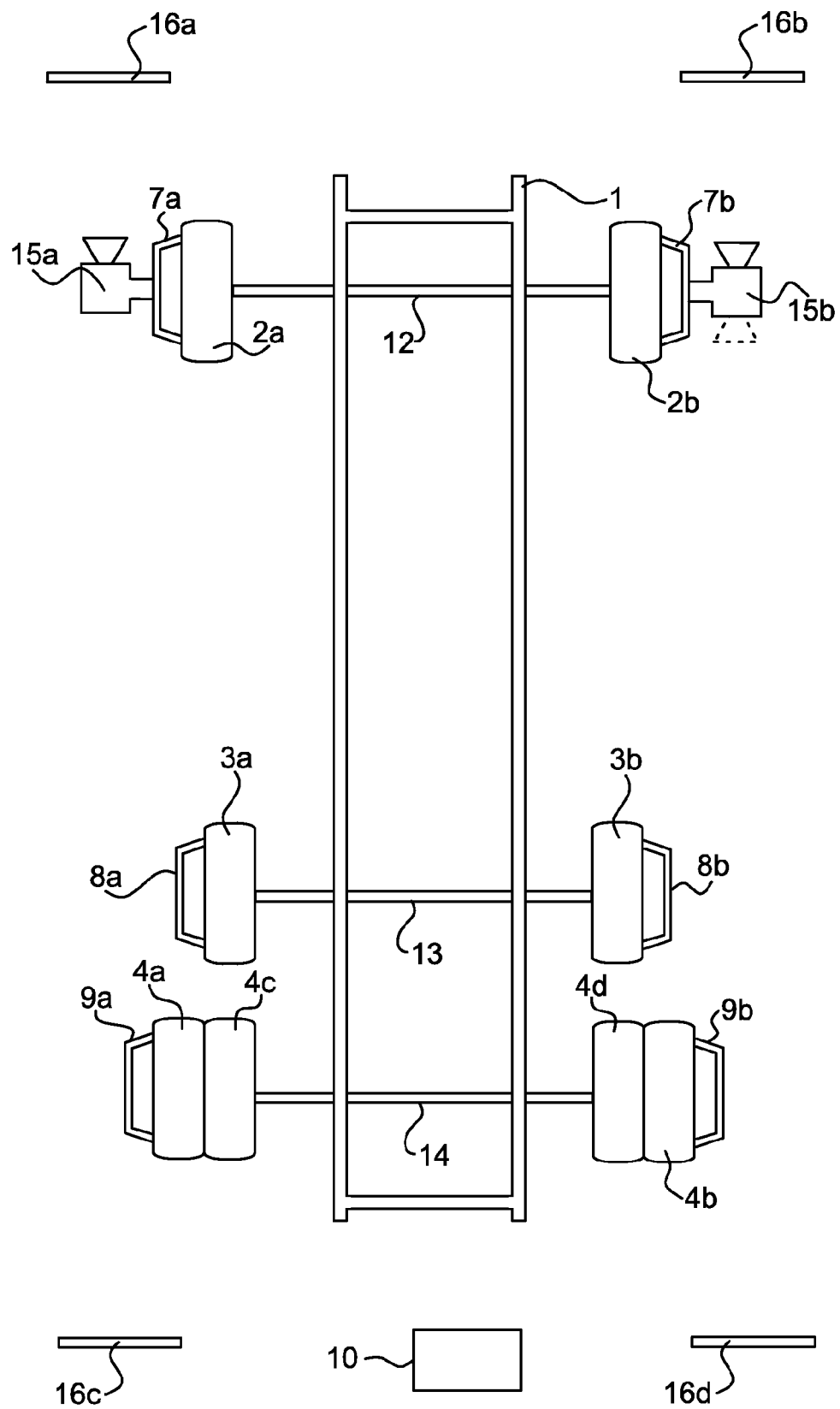
FIG. 2 is a schematic plan view corresponding to FIG. 1 and illustrating a system according to a second embodiment of the invention.

FIG. 2 illustrates such an embodiment wherein the optical measuring instruments are formed of cameras. This system includes digital cameras 15a-b as optical instruments. The digital cameras are mounted on wheel adapters 7-9 on both sides of the vehicle. The digital cameras 15a-b capture images of references elements 16a-d that are positioned at the measuring site in correspondence with what is described above with reference to FIG. 1. The cameras 15a-b may be pivotally arranged on the wheel adapters 7-9 and be rotated from a forward looking direction to a backward looking direction. Alternatively, a digital camera 15a-b that can view both directions simultaneously can be used, which camera does not have to be rotated and is fixedly attached to the wheel adapters.

In addition to calculating the out of square of one or several wheel axles the system and method may also be used for determining and calculating other wheel alignment parameters. Especially such parameters related to the longitudinal geometric centreline of the vehicle may advantageously be determined by utilization of the system and method according to the invention. Examples of such wheel alignment parameters are parallelism of two or several wheel axles, and twin steer alignment. Further examples of wheel alignment parameters that may readily be calculated based on the inventive method and presented to the operator are steering wheel centering, total toe, the thrust line of any wheel axle, the offset of any wheel axle and the set back of any wheel axle.

Above exemplifying embodiments of the invention have been described. The invention is however not limited o these embodiments: To the contrary the invention may be freely varied within the scope of the appended claims. For instance, in stead of arranging reference elements in front and behind the wheels to be measured it is also possible to utilize a first and a second reference element which both are arranged in front or behind the wheels to be measured. For instance a first pair of reference elements may be arranged at one longitudinal side of the vehicle, such that both reference elements are arranged in front of the front wheels, one being arranged sideways outwardly of the other. The horizontal reference lines of both reference elements should be arranged in parallel with each other, e.g. such that both reference lines are arranged in line with each other. A second pair of reference elements may be correspondingly arranged at the other side of the vehicle.

The invention claimed is:

1. A method for determining wheel alignment of a vehicle, which vehicle comprises a first wheel axle having an axle end with at least one wheel member at a respective longitudinal side of the vehicle, the method comprising the steps of:
arranging, for each longitudinal side of the vehicle, a first and a second optical reference element, each having at least two measuring marks defining a horizontal reference line, at fixed positions at a measuring site and such that the reference lines are generally in parallel with each other, wherein the first and second optical reference elements are remote from the vehicle;
positioning the vehicle at the measuring site, such that, for each longitudinal side of the vehicle, there is an unobstructed line-of-sight between the wheel members of the respective first and second optical reference elements,
mounting an optical measuring instrument to a wheel member at each axel end of the first wheel axle, and
mounting an optical measuring instrument to a wheel member at each axel end of a second wheel axle of the vehicle or to each end of a measuring rod mounted to the vehicle;

determining a first relative position of each wheel member and each rod end to which an optical measuring instrument has been mounted, using the optical measuring instrument and the first and second reference elements arranged at each side of the vehicle;

determining a first toe angle of the wheel member at each axle end of the first wheel axle using the optical measuring instrument and the first and second reference elements arranged at each side of the vehicle, determining a first geometrical centerline of the vehicle based on the first relative positions, rotating each wheel member approximately 180°, determining a second relative position of each wheel member and each rod end to which an optical measuring instrument has been mounted, using the optical measuring instrument and the first and second reference elements arranged at each side of the vehicle;

determining a second toe angle of the wheel member at each axle end of the first wheel axle, using the optical measuring instrument and the first and second reference elements arranged at each side of the vehicle, determining a second geometrical centerline of the vehicle based on the second relative positions, and calculating an out of square of the first wheel axle based on the second geometrical centerline of the vehicle, the second toe angles, the difference between the first and second geometrical centerline and the differences between the respective first and second toe angles.

2. A method according to claim 1, comprising determining the first and second relative position of a wheel member at each axle end of a first and a second wheel axle using the optical measuring instrument and the first and second reference elements arranged at each side of the vehicle and wherein the first and second geometrical centerline of the vehicle is determined based on the first and second relative positions of the wheel members at each axle end of a first and a second wheel axle.

3. A method according to claim 1, comprising attaching a rod to the vehicle such that a rod end is arranged at a respective longitudinal side of the vehicle, mounting an optical measuring instrument to each rod end, determining the first and second relative position of each rod end, using the optical measuring instrument and the first and second reference elements arranged at each side of the vehicle, and determining the first and second geometrical centerline of the vehicle based on the first and second relative positions of the rod ends and the wheel members at each axle end of the first wheel axle.

4. A method according to claim 1, comprising arranging a first reference element in front of the vehicle and a second reference element behind the vehicle.

5. A method according to claim 1, comprising arranging a first reference element and a second reference element beside and in front of or behind the vehicle.

6. A method according to claim 1, comprising arranging a first pair of first and second reference elements for a first longitudinal side of the vehicle and a second pair of first and second reference elements for a second longitudinal side of the vehicle.

7. A method according to claim 1, comprising utilizing a single optical measuring instrument and sequentially mounting the single optical measuring instrument to a respective wheel at each axle end of the at least one wheel axle for sequential determination of the relative positions of the respective wheel members.

8. A method according to claim 1, comprising utilizing a first and a second optical measuring instrument.

9. A method according to claim 1, wherein the optical measuring instrument is mounted to a wheel by means of a wheel adapter arranged between the wheel and the optical measuring instrument.

10. A method according to claim 1, wherein determining the relative position of a wheel comprises determining the toe-angle of that wheel, using the optical measuring instrument mounted on the wheel and the first and second reference elements.

11. A method according to claim 1, wherein the optical measuring instrument comprises a laser.

12. A method according to claim 1, wherein the optical measuring instrument comprises a camera.

13. A system for determining wheel alignment of a vehicle, which vehicle comprises a first wheel axle, having an axle end with at least one wheel member at a respective longitudinal side of the vehicle, the system comprising;

a first and a second optical reference element, each having at least two measuring marks defining a reference line, and being arranged to be placed at fixed positions at a measuring site, such that the reference lines are generally in parallel with each other, wherein the first and second optical reference elements are remote from the vehicle;

at least one optical measuring instrument arranged to be mountable to a wheel member at each axel end of the first and second wheel axle and to an end of a rod which is mountable to the vehicle, a computing unit which is connected to the optical measuring instrument and configured to determine a first relative position of each wheel member and each rod end to which an optical measuring instrument has been mounted to determine a first toe angle of the wheel member at each axel end of the first wheel axle, to determine a first geometrical centreline of the vehicle based on the first relative positions, after rotation each wheel member approximately 180°, to determine a second relative position of each wheel member and each rod end to which an optical measuring instrument has been mounted; to determine a second toe angle of the wheel member at each axle end of the first wheel axle; to determine a second geometrical centreline of the vehicle based on the second relative positions; and to calculate an out of square of the first wheel axle based on the second geometrical centreline of the vehicle, the respective second toe angle, the difference between the first and second geometrical centrelines and the differences between the respective first and second toe angles.

\* \* \* \* \*